(12) United States Patent
Amma et al.

(10) Patent No.: US 9,566,870 B2
(45) Date of Patent: Feb. 14, 2017

(54) CHARGING APPARATUS FOR ELECTRIC VEHICLE

(75) Inventors: Kenichi Amma, Tokyo (JP); Takuya Yamazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 590 days.

(21) Appl. No.: 13/876,008

(22) PCT Filed: Jan. 11, 2012

(86) PCT No.: PCT/JP2012/050404
§ 371 (c)(1),
(2), (4) Date: Mar. 26, 2013

(87) PCT Pub. No.: WO2012/096316
PCT Pub. Date: Jul. 19, 2012

(65) Prior Publication Data
US 2013/0175987 A1    Jul. 11, 2013

(30) Foreign Application Priority Data

Jan. 14, 2011  (JP) ................................ 2011-006023

(51) Int. Cl.
*H02J 7/00*    (2006.01)
*B60L 11/18*   (2006.01)
(Continued)

(52) U.S. Cl.
CPC .......... *B60L 11/182* (2013.01); *B60L 11/1829* (2013.01); *H01M 10/44* (2013.01);
(Continued)

(58) Field of Classification Search
USPC ......................................................... 320/109
See application file for complete search history.

(56) References Cited

U.S. PATENT DOCUMENTS 5,392,835 A * 2/1995 Wildt ........................... 160/269
2010/0065352 A1  3/2010 Ichikawa
(Continued)

FOREIGN PATENT DOCUMENTS

CN    1207602    2/1999
CN    2440693    8/2001
(Continued)

OTHER PUBLICATIONS

International Search Report issued Apr. 3, 2012 in International (PCT) Application No. PCT/JP2012/050404.
(Continued)

*Primary Examiner* — Robert Grant
(74) *Attorney, Agent, or Firm* — Wenderoth, Lind & Ponack, L.L.P.

(57) ABSTRACT

A charging apparatus for an electric vehicle, the electric vehicle is parked on a power transmission unit provided on the ground, a power receiving unit provided on a lower surface of a vehicle body of the electric vehicle is aligned with the power transmission unit, and the power receiving unit receives electric power energy aerially fed from the power transmission unit to charge a battery mounted on the electric vehicle in a non-contact manner, and the charging apparatus includes a shielding unit for shielding an operation surface of the power receiving unit from outside without hindering power transmission and receiving action. A rolling screen is preferable as the shielding unit.

2 Claims, 7 Drawing Sheets

(51) Int. Cl.
  *H01M 10/44*   (2006.01)
  *H01M 10/46*   (2006.01)
  *H02J 7/02*    (2016.01)
  *H02J 5/00*    (2016.01)

(52) U.S. Cl.
  CPC ............ *H01M 10/46* (2013.01); *H02J 5/005* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | |
|---|---|---|
| 2010/0225271 A1 | 9/2010 | Oyobe et al. |
| 2011/0121778 A1 | 5/2011 | Oyobe et al. |

FOREIGN PATENT DOCUMENTS

| | | |
|---|---|---|
| EP | 0 874 378 | 10/1998 |
| JP | 7-236204 | 9/1995 |
| JP | 10-214737 | 8/1998 |
| JP | 10-304583 | 11/1998 |
| JP | 2008-54424 | 3/2008 |
| JP | 2008-253131 | 10/2008 |
| JP | 2009-106136 | 5/2009 |
| JP | 2010-70048 | 4/2010 |

OTHER PUBLICATIONS

Patent Cooperation Treaty (PCT) Written Opinion of the International Searching Authority issued Apr. 3, 2012 in International (PCT) Application No. PCT/JP2012/050404.
Office Action issued Oct. 29, 2014 in corresponding Chinese patent application No. 201280003137.1 (with English translation).

\* cited by examiner

CHARGING APPARATUS FOR ELECTRIC VEHICLE

BACKGROUND OF THE INVENTION

1. Technical Field

The present invention relates to a charging apparatus for an electric vehicle where the electric vehicle is stopped on a power transmission unit provided on the ground, and a battery mounted on the electric vehicle is charged in a non-contact manner.

2. Description of the Related Art

Recently, for conservation of the global environment, electric vehicles such as hybrid vehicles that travel by driving an electric motor using electric power from an on-vehicle battery in addition to power of an internal combustion engine, and electric automobiles that travel using a drive force of only an electric motor have rapidly become widespread. A non-contact charging apparatus for an electric vehicle as disclosed in Japanese Unexamined Patent Application, Publication No. 2008-253131 and Japanese Unexamined Patent Application, Publication No. 2009-106136 have been proposed to omit an operation of connecting a battery charger and a vehicle body using a charging cable and simplify a charging operation when charging an on-vehicle battery for electric vehicles.

Such a charging apparatus includes a power transmission unit provided on the ground such as the floor of a parking lot, and a power receiving unit provided on a lower surface of a vehicle body of an electric vehicle. In charging an on-vehicle battery, the vehicle body is parked so that the power receiving unit on the vehicle body is located immediately above the power transmission unit on the ground, and electric power is fed from the power transmission unit to the power receiving unit for charging by electromagnetic induction without contact between the power transmission unit and the power receiving unit. A non-contact method for electric power feeding may include microwaves or magnetic resonance besides electromagnetic induction.

SUMMARY OF THE INVENTION

1. Technical Problem

In this way, in the charging apparatus including the power receiving unit provided on the lower surface of the vehicle body of the electric vehicle, mud, dust, or the like tends to adhere to and contaminate the power receiving unit during vehicle travel. If non-contact charging is performed with the power receiving unit being contaminated, a charging error is highly likely to occur. Also, for example, in non-contact charging using microwaves, adhering dirt may cause overheating and result in smoking, ignition, anchoring, or the like depending on components of the dirt.

In order to remove dirt adhering to the power receiving unit before the start of charging, for example, a water nozzle may be provided on the power transmission unit so as to jet water or hot water toward the power receiving unit to wash the power receiving unit, or a cleaning brush that can protrude upward may be provided on the power transmission unit to brush off dirt on the power receiving unit from below. However, providing the water nozzle or the cleaning brush on the power transmission unit increases the size of power transmission equipment, which is undesirable in terms of cost or maintenance.

The present invention is achieved in view of the above described circumstances, and provides a charging apparatus for an electric vehicle that has a simple and reliable structure, and thus prevents contamination of a power receiving unit provided on an electric vehicle, or a power transmission unit provided on the ground, and allows stable charging.

2. Solution to the Problem

To achieve the above described object, the present invention adopts means described below.

A first aspect of the present invention provides a charging apparatus for an electric vehicle in which the electric vehicle is parked on a power transmission unit provided on the ground, a power receiving unit provided on a lower surface of a vehicle body of the electric vehicle is aligned with the power transmission unit, and the power receiving unit receives electric power energy aerially fed from the power transmission unit to charge a battery mounted on the electric vehicle in a non-contact manner. The charging apparatus comprises a shielding unit for shielding an operation surface of at least one of the power receiving unit and the power transmission unit from outside without hindering power transmission and receiving action.

According to the above configuration, the shielding unit shields the operation surface of the power receiving unit or the power transmission unit from outside to prevent contamination of the operation surface. For example, if the shielding unit is added to the power receiving unit provided on the lower surface of the vehicle body of the electric vehicle, the power receiving unit is prevented from being contaminated by adhesion of mud, dust, or the like during traveling of the electric vehicle. Also, if the shielding unit is added to the power transmission unit provided on a floor of a parking lot, fallen leaves or insects are prevented from accumulating on the power transmission unit. This allows stable charging.

A second aspect of the present invention provides the charging apparatus for an electric vehicle in the first aspect, wherein the shielding unit is a rolling screen provided to cover the operation surface. According to this configuration, an extremely simple and reliable configuration can prevent contamination of the power receiving unit provided on the electric vehicle or the power transmission unit provided on the ground.

In the second aspect, the rolling screen may include a rolling-up mechanism so as to permit the screen to openably/closably cover the operation surface, and expose the operation surface to the outside when opened.

In the above described configuration, for example, when the power receiving unit provided on the lower surface of the vehicle body of the electric vehicle is covered with the rolling screen, the rolling screen can be closed during vehicle travel to prevent contamination of the power receiving unit, and the rolling screen can be opened for charging. During charging, the rolling screen is not interposed between the power transmission unit on the ground and the power receiving unit on the vehicle body, thereby preventing charging errors and allowing reliable charging.

In the second aspect, the rolling screen may be made of a material that does not hinder power transmission and receiving action, and always cover the operation surface, and the rolling-up mechanism may change a covering range of the operation surface.

According to the above described configuration, even if the rolling screen is interposed between the power transmission unit on the ground and the power receiving unit on the vehicle body, the rolling screen does not hinder the power transmission and receiving action. Thus, the rolling screen can always cover the power transmission unit or the power receiving unit, thereby reliably preventing contamination of the power transmission unit and the power receiving unit and allowing stable charging.

Further, even if the rolling screen is soiled, a soiled surface can be rolled up by the rolling-up mechanism to always place a clean surface between the power transmission unit and the power receiving unit, thereby avoiding any adverse effects due to overheating or the like caused by dirt adhering to the rolling screen.

The charging apparatus for an electric vehicle according to any one of the above described aspects may include a sweeping unit for sweeping off dirt adhering to the surface of the rolling screen with opening/closing and rolling-up operations of the rolling screen.

According to the above described configuration, every time the opening/closing and rolling-up operations of the rolling screen are performed, the sweeping unit sweeps off the dirt adhering to the surface of the rolling screen to always keep the surface of the rolling screen clean. Thus, particularly for the charging apparatus in which the rolling screen always covers the power transmission unit or the power receiving unit, dirt adhering to the rolling screen is prevented from being interposed between the power transmission unit and the power receiving, thereby allowing stable charging.

In the first aspect, the shielding unit may be a shutter mechanism that is formed of a rigid body and openably/closably covers the operation surface. According to this configuration, the operation surface of the power receiving unit or the power transmission unit is shielded from outside by the shutter mechanism to prevent contamination of the operation surface, thereby allowing stable charging. The shutter mechanism can be robustly configured, thereby increasing reliability.

3. Advantages of the Invention

As described above, according to the charging apparatus for an electric vehicle of the present invention, a charging apparatus for an electric vehicle can be provided that has a simple and reliable structure and thus can prevent contamination of a power receiving unit provided on the electric vehicle.

DETAILED DESCRIPTION OF THE INVENTION

Now, multiple embodiments of a charging apparatus for an electric vehicle according to the present invention will be described with reference to the drawings.

Figure 1:
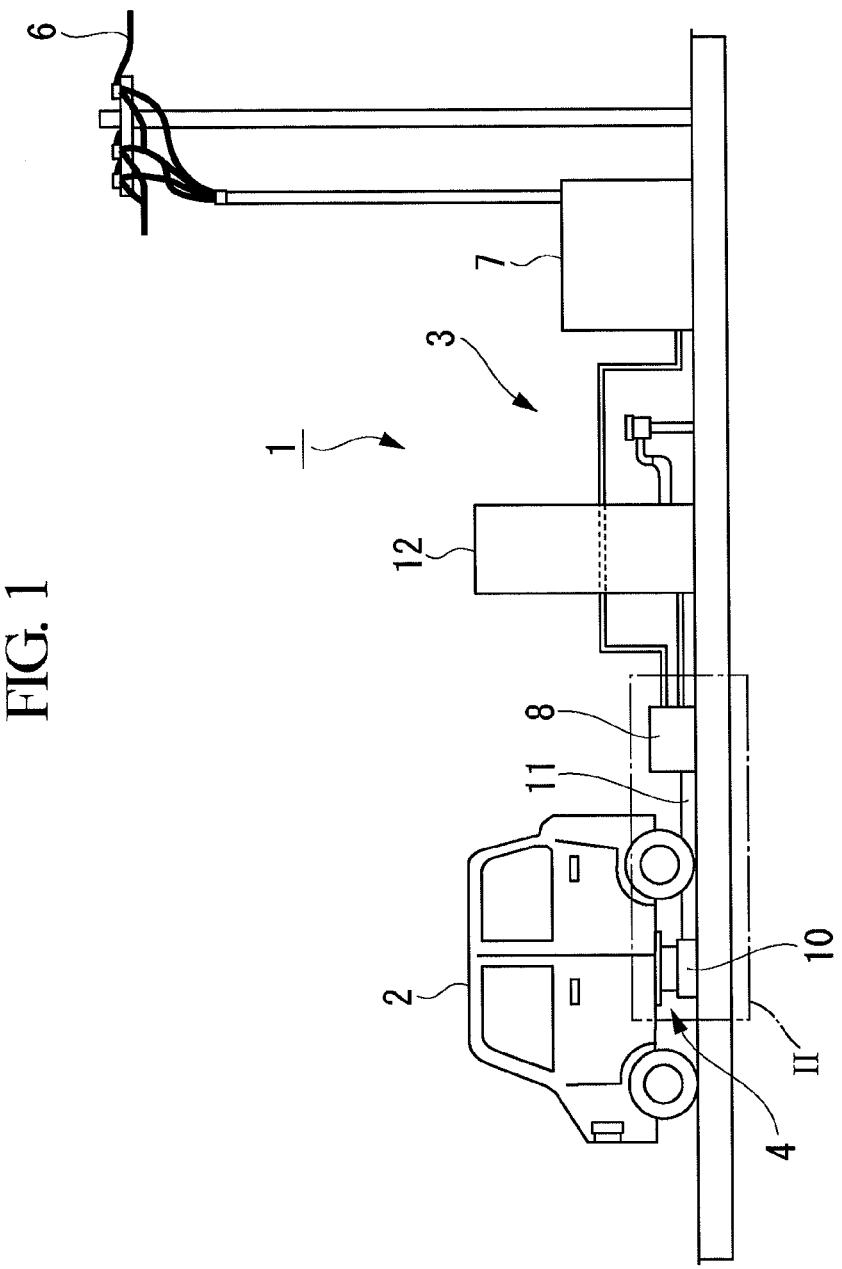
FIG. 1 is a side view showing a schematic general configuration of a charging apparatus for an electric vehicle according to the present invention.

FIG. 1 is a side view showing a schematic general configuration of a charging apparatus for an electric vehicle according to the present invention. The charging apparatus 1 is configured so that an electric vehicle 2 is parked on a dedicated parking lot, and a battery for driving a motor mounted on the electric vehicle 2 is charged in a non-contact manner. The charging apparatus 1 includes a power transmission system 3 provided on the ground, and a power receiving system 4 provided on a lower surface of a vehicle body of the electric vehicle 2. As an example of a method of feeding electric power in a non-contact manner, an electric power conversion method using microwaves is applied herein.

Figure 2:
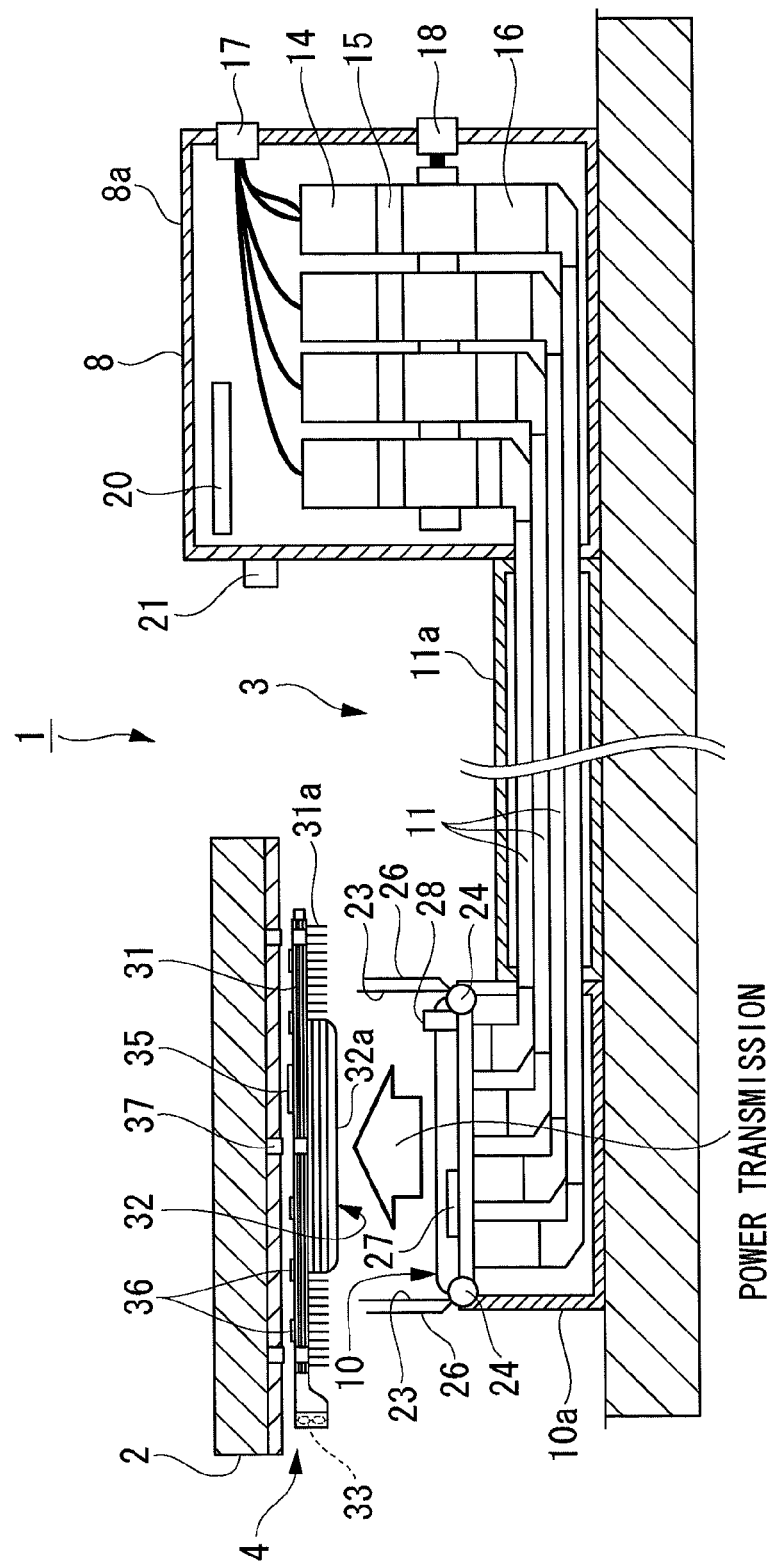
FIG. 2 is an enlarged side view of the charging apparatus shown in FIG. 1.

The power transmission system 3 includes a power supply unit 7 that takes in electric power from an external electric power line 6 (commercial power supply), and converts the electric power into a power supply suitable for conversion into microwaves, a microwave conversion unit 8 that converts the electric power fed from the power supply unit 7 into microwaves of, for example, 2.45 GHz, a power transmission unit 10 provided on a substantially middle portion of a parking space of the electric vehicle 2, a power transmission conductor 11 that transmits the microwaves converted by the microwave conversion unit 8 to the power transmission unit 10, and water-cooling/hot-water supply equipment 12. As shown in FIG. 2, the microwave conversion unit 8 includes a plurality of transformers 14, a rectifier 15, and a magnetron 16 in a conversion unit casing 8*a*, and further includes an interface 17 to the power supply unit 7, an interface 18 to the water-cooling/hot-water supply equipment 12, a control unit 20, and a communication unit 21.

Electric power is fed from the power supply unit 7 via the interface 17 to the magnetron 16, and converted into microwaves by the magnetron 16. Since the fed electric power is partially converted into heat to cause the magnetron 16 to generate heat, the water-cooling/hot-water supply equipment 12 supplies cooling water via the interface 18 to the magnetron 16 to cool and increase the life of the magnetron 16. The cooling water heated by cooling the magnetron 16 is returned to the water-cooling/hot-water supply equipment 12, fed by a pump to hot-water supply equipment inside a house or the like and used as hot water. Thus, electric energy is recovered without waste.

The power transmission unit 10 has, for example, a rectangular shape in plan view, and is provided horizontally on an upper portion of a power transmission unit casing 10*a*. A shielding member 23 in the form of a peripheral wall, for example, formed of a brush is provided to surround the power transmission unit 10. The shielding member 23 can be moved up and down by an up/down movement mechanism 24. A conduction sensor 26, a temperature sensor 27, a position sensor 28, or the like are added to the power transmission unit 10. Meanwhile, a power transmission conductor 11 is housed in a power transmission casing 11*a* to connect the magnetron 16 in the microwave conversion unit 8 and the power transmission unit 10.

On the other hand, the power receiving system 4 provided on the lower surface of the vehicle body of the electric vehicle 2 includes a radiator 31 formed into a plate shape having a large area and secured to the lower surface of the vehicle body, and a power receiving unit 32 provided on a lower surface of a middle portion of the radiator 31. The radiator 31 includes many radiator fins 31a integrally formed of a material having high thermal conductivity such as aluminum and protruding downward. A cooling cavity (not shown) is formed in the radiator 31, and a cooling fan 33 is provided at one end of the radiator 31. Heat of the power receiving unit 32 generated during charging is transferred to the radiator 31, the cooling fan 33 supplies outside air to the cooling cavity in the radiator 31 to cool the heat of the power receiving unit 32 transferred to the radiator 31. The radiator 31 includes a control unit 35 and a temperature sensor 36, and further an interface 37 for connecting the power receiving unit 32 or the sensors to the vehicle body.

The power receiving unit 32 has a rectangular shape in plan view, and is slightly smaller than the power transmission unit 10. For example, if the power transmission unit 10 has a length of 40 cm and a width of 30 cm, the power receiving unit 32 is set to have a length of about 30 cm and a width of about 20 cm. The power transmission unit 10 and the power receiving unit 32 may be smaller without any effect on power transmission and receiving performance. The power transmission unit 10 and the power receiving unit 32 may have a shape other than the rectangular shape, such as a circular shape or an oval shape.

The electric vehicle 2 is parked so that the power receiving unit 32 on the lower surface of the vehicle body is aligned with the power transmission unit 10 provided on a substantially middle portion of a parking lot. When, for example, an ignition key of the electric vehicle 2 is removed, the control unit 35 automatically checks the remaining battery level of the on-vehicle battery, and if the level is not full, charging is started. At this time, the position sensor 28 previously checks that the power receiving unit 32 is aligned with the power transmission unit 10 within a set range, and if misalignment is significant, charging is not started.

When it is confirmed that the power receiving unit 32 is aligned with the power transmission unit 10 within a set range, the shielding member 23 surrounding the power transmission unit 10 is moved up to shield the power transmission unit 10 and the power receiving unit 32 from outside so as to prevent an influence of the microwaves from extending peripherally, and prevent foreign matter or insects from entering the area between the power transmission unit 10 and the power receiving unit 32. When the charging apparatus is ready for charging, the microwaves converted from the electric power energy by the microwave conversion unit 8 are transmitted via the power transmission conductor 11 to the power transmission unit 10. Further, the power transmission unit 10 aerially feeds electric power to the power receiving unit 32, and the power receiving unit 32 receives the electric power to charge the on-vehicle battery in a non-contact manner. When the charging is completed, the shielding member 23 is automatically moved down to about a height of the power transmission unit 10. In such a non-contact charging method using microwaves, charging can be performed without problem even if the power transmission unit 10 is slightly misaligned with the power receiving unit 32, and positional accuracy of parking of the electric vehicle 2 is less necessary.

Meanwhile, during traveling of the electric vehicle 2, mud, dust, or the like tends to adhere to the power receiving unit 32 in the power receiving system 4 provided on the lower surface of the vehicle body. In order to prevent such contamination of the power receiving unit 32, a shielding unit is provided for shielding the operation surface (lower surface) 32a of the power receiving unit 32 from outside without hindering power transmission and receiving action. First to fourth embodiments of the shielding unit will be individually described below.

First Embodiment

Figure 3:
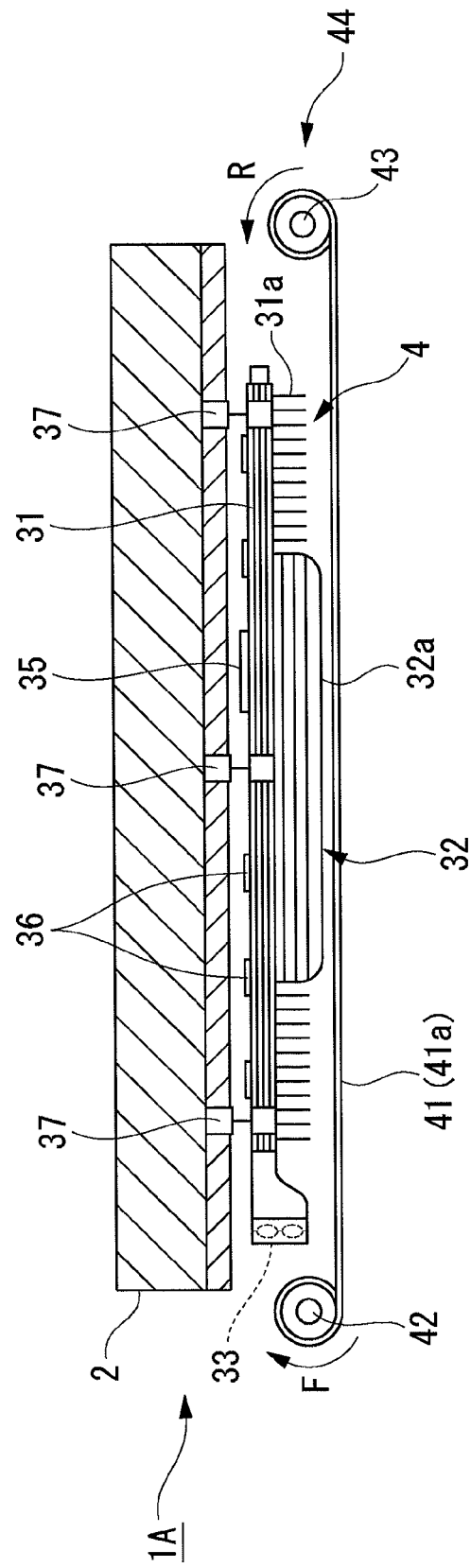
FIG. 3 is a side view of a charging apparatus (power receiving unit) according to a first embodiment of the present invention.
Figure 4A:
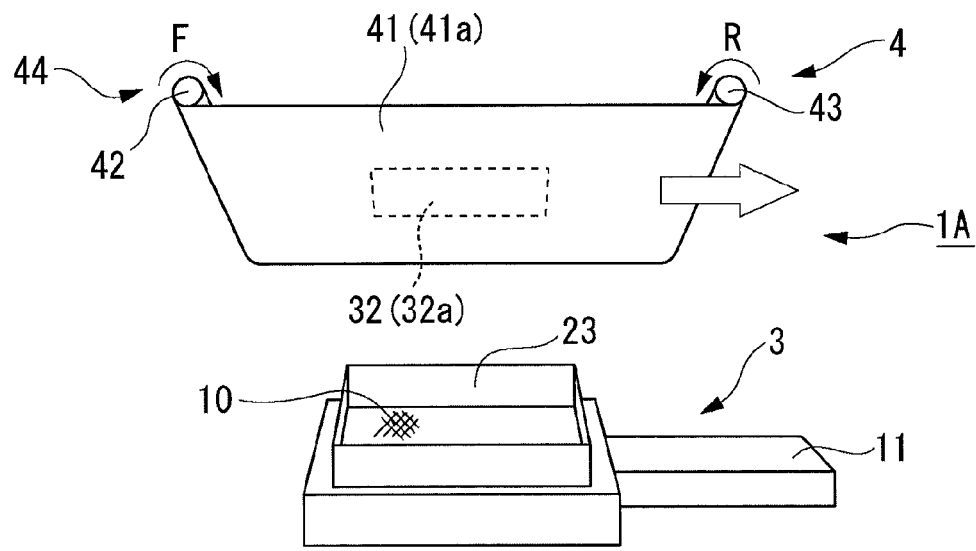
FIG. 4A shows a non-charging state where the power receiving unit is covered with a rolling screen.
Figure 4B:
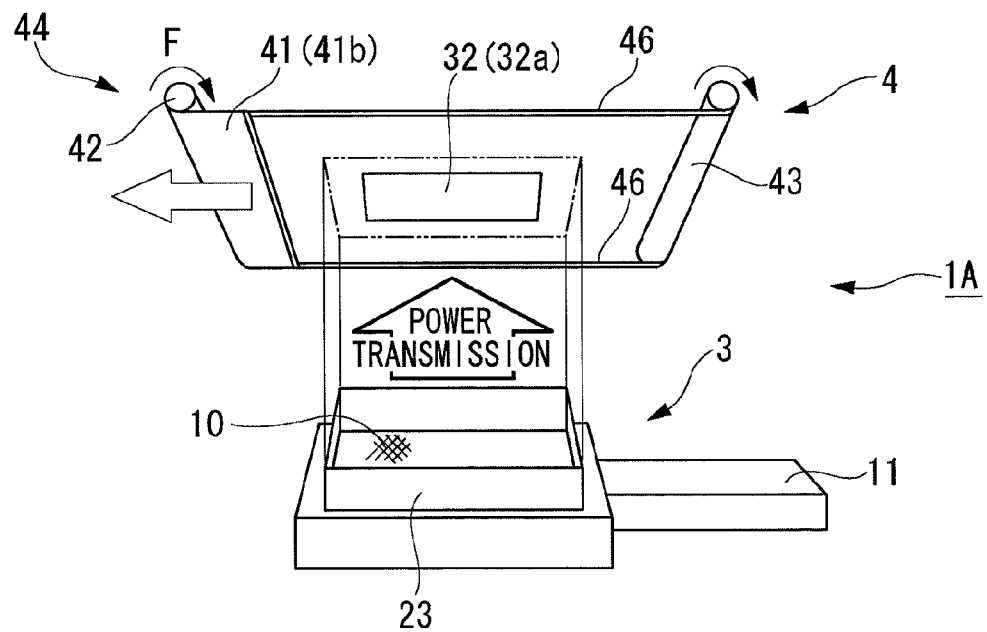
FIG. 4B shows a charging state where the power receiving unit is exposed to the outside.

FIG. 3 is a side view showing a first embodiment of a charging apparatus including a shielding unit in a power receiving unit 32. In the charging apparatus 1A, a rolling screen 41 that covers an operation surface of the power receiving unit 32 is provided as a shielding unit. The rolling screen 41 is formed of a strong film material such as an aramid material, for example, Kevlar (registered trademark of Du Pont: proper name is poly-paraphenylene terephthalamide). As shown in FIGS. 3 and 4A, the rolling screen 41 is configured so as to be opened/closed between a cover position 41a covering the operation surface 32a of the power receiving unit 32, and an open position 41b exposing the power receiving unit 32 to an outside as shown in FIG. 4B. Specifically, for example, rollers 42, 43 extending in a width direction of the electric vehicle 2 are journaled at a front and a rear of a radiator 31 as a base of a power receiving system 4 to constitute a rolling-up mechanism 44, and the rolling screen 41 is stretched between the rollers 42, 43.

For example, the roller 42 located at a front in a vehicle traveling direction is always urged in a rotational direction F to roll up the rolling screen 41 toward the open position 41b. The roller 43 located at a rear in the vehicle traveling direction is rotated in a rotational direction R by a force of an drive motor (not shown) or the like to allow the rolling screen 41 rolled up on the roller 42 to be drawn to the cover position 41a against a biasing force of the roller 42. As shown in FIG. 4A, when the rolling screen 41 is drawn to the cover position 41a, the rolling screen 41 is horizontally stretched in a position several millimeters to several centimeters below the power receiving unit 32 (operation surface 32a) to cover the power receiving unit 32.

As shown in FIG. 4B, for example, an end of the rolling screen 41 and the roller 43 are coupled by a pair of left and right drawing wires 46. When the roller 42 is rotated in the rotational direction F to completely roll up the rolling screen 41, only the two drawing wires 46 are stretched between the roller 42 and the roller 43, and the power receiving unit 32 is exposed between the drawing wires 46. A space between the two drawing wires 46 (that is, a width of the rolling screen 41) is sufficiently larger than a width of the shielding member 23 of the power transmission unit 10 so that the drawing wires 46 do not interfere with the power transmission unit 10 and the power receiving unit 32 during charging.

The rolling screen 41 is kept drawn to the cover position 41a by the control device 35 during traveling and non-charging of the electric vehicle 2, and rolled up to the open position 41b immediately before the electric vehicle 2 is parked in a predetermined position and charging is started.

Such a rolling screen 41 is provided, and thus with an extremely simple and reliable configuration, the power receiving unit 32 can be shielded from outside to effectively prevent the operation surface 32a of the power receiving unit 32 from being contaminated by adhesion of mud, dust, or the like during traveling of the electric vehicle 2. The rolling screen 41 includes the rolling-up mechanism 44 to openably/closably cover the power receiving unit 32, and completely expose the power receiving unit 32 to the outside in the open position 41b. Thus, the rolling screen 41 can be moved to the cover position 41a to prevent contamination of the power receiving unit 32 during traveling of the electric vehicle 2, and the rolling screen 41 can be moved to the open position 41b to perform charging during a charging operation. The rolling screen 41 is not interposed between the power transmission unit 10 on the ground and the power receiving unit 32 on the vehicle body during charging, thereby preventing a charging error and allowing reliable charging.

Second Embodiment

Figure 5:
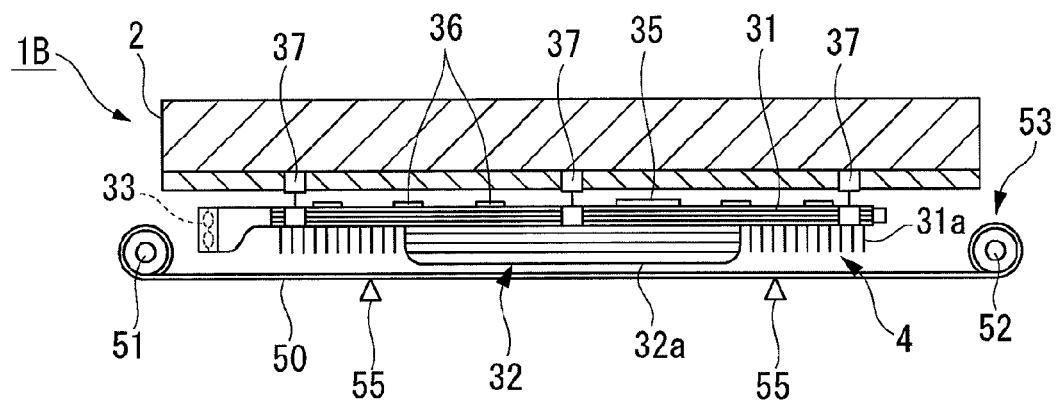
FIG. 5 is a side view of a charging apparatus (power receiving unit) according to a second embodiment of the present invention.
Figure 6:
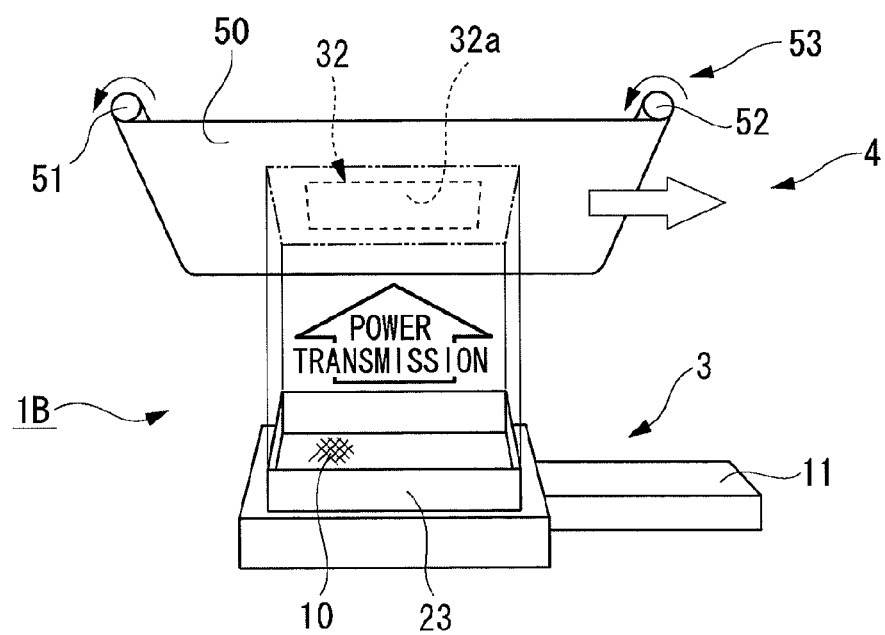
FIG. 6 shows an operation of a rolling screen shown in FIG. 5.

FIGS. 5 and 6 are side views showing a second embodiment of a charging apparatus including a shielding unit. A basic configuration of the charging apparatus 1B is the same as that of the charging apparatus 1A of the first embodiment except for the shielding unit, and thus the same components are denoted by the same reference numerals and descriptions thereof will be omitted. Also in the charging apparatus 1B, a rolling screen 50 is provided as a shielding unit for covering an operation surface 32a of a power receiving unit 32. The rolling screen 50 is made of a material that does not hinder power transmission and receiving action between a power transmission unit 10 and the power receiving unit 32. A material through which microwaves can pass is preferable, and, for example, an aramid material similar to the material of the rolling screen 41 in the first embodiment is preferable.

The rolling screen 50 is configured to always cover the power receiving unit 32. Specifically, as in the first embodiment, rollers 51, 52 are journaled at a front and a rear of a radiator 31 as a base of a power receiving system 4 to constitute a rolling-up mechanism 53, and the rolling screen 50 is stretched between the rollers 51, 52. Only a range of the rolling screen 50 covering the power receiving unit 32 is changed by the rolling-up mechanism 53, and the power receiving unit 32 is not exposed as in the first embodiment. As shown in FIG. 6, the rolling screen 50 is always fed in one direction at predetermined time intervals.

The rolling screen 50 is made of a material through which microwaves transmitted from the power transmission unit 10 to the power receiving unit 32 can pass, and thus charging can be performed with the rolling screen 50 covering the power receiving unit 32. Thus, the rolling screen 50 can always cover the power receiving unit 32, thereby reliably preventing contamination of the power receiving unit 32 and allowing stable charging. Also, even if the rolling screen 50 is soiled, a soiled surface can be rolled up by the rolling-up mechanism 53 to always place a clean surface between the power transmission unit 10 and the power receiving unit 32, thereby avoiding any adverse effects due to overheating or the like of dirt adhering to the rolling screen 50.

Further, a pair of front and rear scrapers 55 are supported by stay members (not shown) so as to be located below the rolling screen 50 and in the front and the rear of the power receiving unit 32. The scraper 55 has, at an upper end, an edge portion that always slightly abuts against a lower surface of the rolling screen 50, and functions as a sweeping unit for sweeping off dirt such as mud adhering to the lower surface of the rolling screen 50 when the rolling screen 50 is rolled up by the rolling-up mechanism 53.

Such a sweeping unit is provided to always keep a clean surface of the rolling screen 50. Thus, for a configuration like the charging apparatus 1B in which the rolling screen 50 always covers the power receiving unit 32, dirt adhering to the rolling screen 50 is prevented from being interposed between the power transmission unit 10 and the power receiving unit 32 to cause any adverse effects, thereby allowing stable charging.

Third Embodiment

Figure 7:
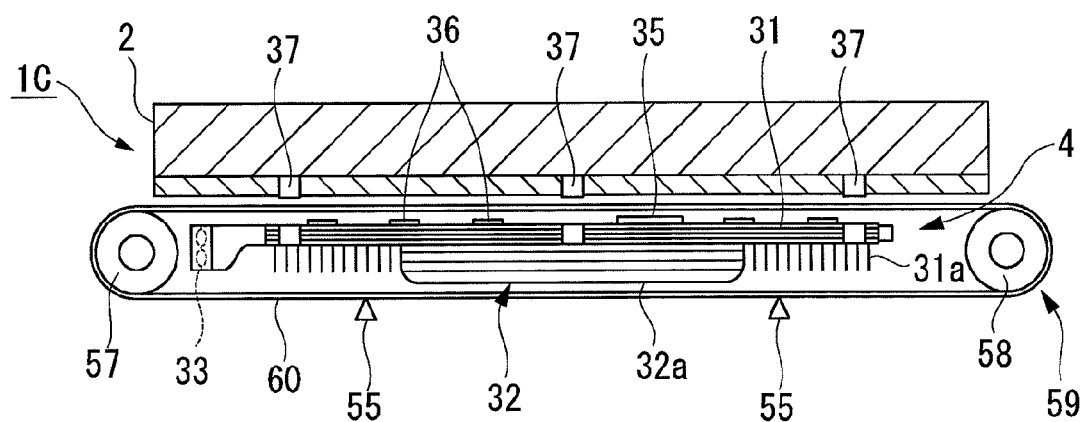
FIG. 7 is a side view of a charging apparatus (power receiving unit) according to a third embodiment of the present invention.
Figure 8:
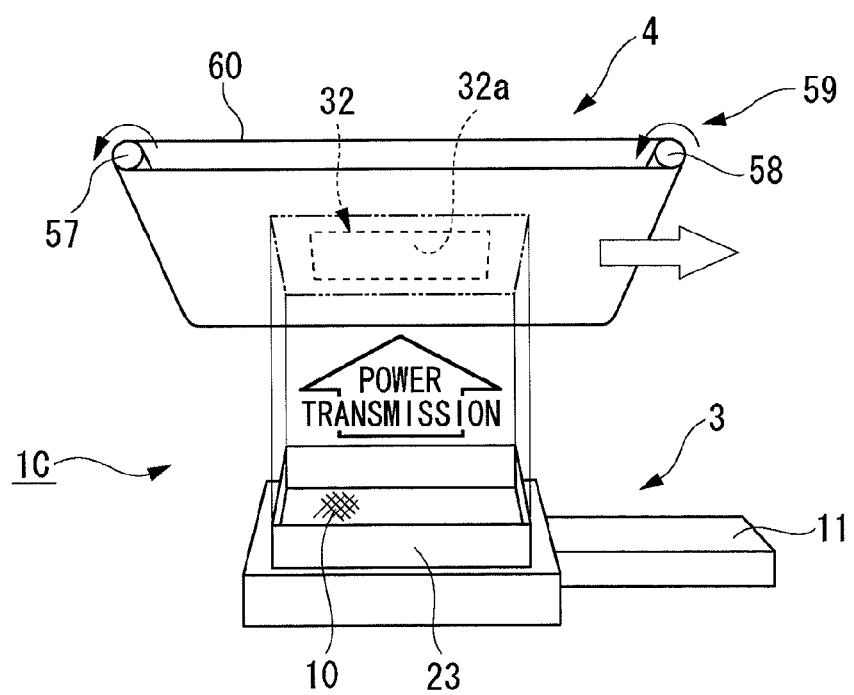
FIG. 8 shows an operation of a rolling screen shown in FIG. 7.

FIGS. 7 and 8 are side views showing a third embodiment of a charging apparatus including a shielding unit. The charging apparatus 1C is a modification of the charging apparatus 1B of the second embodiment. Specifically, the charging apparatus 1C is similar to the charging apparatus 1B in that rollers 57, 58 are journaled at a front and a rear of a radiator 31 to constitute a rolling-up mechanism 59, while the radiator 31 and a power receiving unit 32 are provided on an inner periphery of an annular rolling screen 60 provided to surround the rollers 57, 58, and the annular rolling screen 60 surrounds the entire power receiving system 4.

The rolling screen 60 is made of a material through which microwaves can pass as in the charging apparatus 1B of the second embodiment. A pair of scrapers 55 is provided as a sweeping unit on a lower surface of the rolling screen 60 as in the second embodiment. As shown in FIG. 8, the rolling screen 60 is always fed in one direction at predetermined time intervals, and every time the rolling screen 60 is fed, the scraper 55 sweeps off dirt adhering to the lower surface of the rolling screen 60.

According to the above described configuration, the power receiving unit 32 (operation surface 32a), and also the entire power receiving system 4 are surrounded by the rolling screen 60, thereby effectively preventing contamination of components of the power receiving system 4. Reducing a length of the rolling screen 60 and limiting a rotational direction of the rollers 57, 58 in one direction to simplify a structure of the rolling-up mechanism 59, thereby preventing failure or the like and increasing reliability.

Fourth Embodiment

Figure 9:
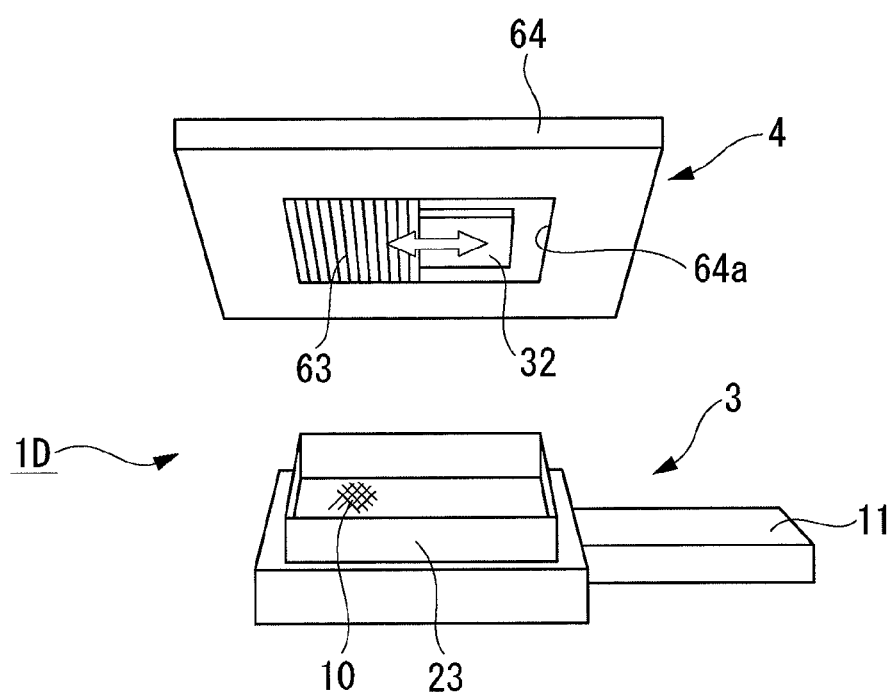
FIG. 9 is a perspective view of a charging apparatus (power receiving unit) according to a fourth embodiment of the present invention.

FIG. 9 is a perspective view showing a fourth embodiment of a charging apparatus including a shielding unit. In the charging apparatus 1D, a shutter mechanism 63 formed of a rigid body of such as metal or resin is used as a shielding unit rather than the rolling screen to openably/closable cover the power receiving unit 32. Specifically, the entire power receiving system 4 is housed in a dustproof box 64, for example, made of resin, a large opening 64a is formed in a lower surface of the dustproof box 64 to match a position of the power receiving unit 32 so that the opening 64a can be opened/closed by the shutter mechanism 63. The opening 64a is desirably larger than an outer size of shielding member 23 so that a tip of the shielding member 23 enters the opening 64a during charging.

In the charging apparatus 1D, during traveling and non-charging of the electric vehicle 2, the shutter mechanism 63 is closed to protect the entire power receiving system 4 from contamination, the shutter mechanism 63 is opened to expose the power receiving unit 32 to the outside only during charging, and non-contact charging is performed between the power receiving unit 32 and the power transmission unit 10. According to this configuration, the power receiving unit 32 is shielded from outside by the shutter mechanism 63 and prevented from being contaminated, thereby allowing stable charging. The shutter mechanism 63 can be robustly configured, thereby increasing reliability of the charging apparatus 1D.

The radiator 31 (see FIG. 2) that radiates heat generated by the power receiving unit 32 during charging is also housed in the dustproof box 64, and thus a cooling fan for taking outside air as cooling air into the dustproof box 64 is preferably provided so that the radiator 31 can easily perform heat exchange with the outside air. In this case, the cooling fan sucks outside air, a filter member removes dust from the outside air, the air is then taken into the dustproof box 64 as cooling air, and the cooling air heated by heat from the radiator 31 is discharged from the opening 64a, thereby preventing foreign matter such as dust from entering through the opening 64a into the dustproof box 64.

It goes without saying that the technical range of the present invention is not limited to the aspects of the embodiments, and for example, the aspects of the embodiments may be combined. Also, a shielding unit similar to those in the first to fourth embodiments may be added to the power transmission unit 10 on the ground. This can prevent fallen leaves or insects from accumulating on the operation surface (upper surface) of the transmission unit 10 and allow stable charging.

REFERENCE SIGNS LIST

1, 1A, 1B, 1C, 1D charging apparatus
2 electric vehicle
3 power transmission system
4 power receiving system
8 microwave conversion unit
10 power transmission unit
23 shielding member
32 power receiving unit
32a operation surface
41, 50, 60 rolling screen (shielding unit)
44, 53, 59 rolling-up mechanism
63 shutter mechanism (shielding unit)

The invention claimed is:

1. A charging apparatus for an electric vehicle in which the electric vehicle is parked on a power transmission unit provided on the ground, a power receiving unit provided on a lower surface of a vehicle body of the electric vehicle is aligned with the power transmission unit, and the power receiving unit receives electric power energy aerially fed from the power transmission unit to charge a battery mounted on the electric vehicle in a non-contact manner, the charging apparatus comprising:
a shielding unit for shielding an operation surface of at least one of the power receiving unit and the power transmission unit from outside without hindering power transmission and receiving action,
wherein the shielding unit is a rolling screen provided to cover the operation surface,
wherein the rolling screen is made of a material that does not hinder power transmission and receiving action, and always covers the operation surface during charging and during traveling of the electric vehicle, and
wherein a portion of the rolling screen covering an entire surface of the operation surface can be changed by the rolling-up mechanism.

2. The charging apparatus for an electric vehicle according to claim 1, further comprising a sweeping unit for sweeping off dirt adhering to the surface of the rolling screen during rolling-up operations of the rolling screen.

* * * * *